(12) United States Patent
Awasthi et al.

(10) Patent No.: US 10,191,879 B2
(45) Date of Patent: Jan. 29, 2019

(54) SYSTEM AND METHOD FOR CREATING SNAPSHOTS IN OPENFLAME ENVIRONMENT

(71) Applicant: Veritas Technologies LLC, Mountain View, CA (US)

(72) Inventors: Nirendra Awasthi, Pune (IN); Christopher Uhler, Palo Alto, CA (US); Niranjan S. Pendharkar, Pune (IN); Subhadeep De, Sunnyvale, CA (US); Vidyut Kaul, Sunnyvale, CA (US); Chaitanya Yalamanchili, Santa Clara, CA (US); Ketan Nilangekar, Mountain View, CA (US); Abhishek Narula, Pune (IN); Ketan Mahajan, Maharashtra (IN); Phani Karthik Maradani, Maharashtra (IN); Puneet Bakshi, Maharashtra (IN); Suhas Ashok Dantkale, Mountain View, CA (US)

(73) Assignee: Veritas Technologies LLC, Mountain View, CA (US)

(*) Notice: Subject to any disclaimer, the term of this patent is extended or adjusted under 35 U.S.C. 154(b) by 0 days.

(21) Appl. No.: 14/740,089

(22) Filed: Jun. 15, 2015

(65) Prior Publication Data
US 2016/0292074 A1 Oct. 6, 2016

(30) Foreign Application Priority Data
Mar. 31, 2015 (IN) .............................. 907/DEL/2015

(51) Int. Cl.
*G06F 12/08* (2016.01)
*G06F 11/14* (2006.01)
(Continued)

(52) U.S. Cl.
CPC .......... *G06F 13/4027* (2013.01); *G06F 3/068* (2013.01); *G06F 3/0613* (2013.01);
(Continued)

(58) Field of Classification Search
CPC ............. G06F 11/1451; G06F 12/0804; G06F 12/0815; G06F 13/4027;
(Continued)

(56) References Cited

U.S. PATENT DOCUMENTS

2016/0041882 A1* 2/2016 Kruse ................. G06F 11/1438
714/16
2016/0323653 A1* 11/2016 Chen .................. H04N 21/6587

* cited by examiner

*Primary Examiner* — Yong Choe
(74) *Attorney, Agent, or Firm* — Patent Law Works LLP

(57) ABSTRACT

A method for creating snapshots and backups in a virtual computing environment is provided. The method includes writing application output of an application spanning one or more virtual machines as an application consistency group to a writeback cache, wherein the one or more virtual machines are implemented using one or more compute nodes and wherein the writeback cache is implemented in direct attached storage in the one or more compute nodes. The method includes pausing I/O (input/output) operations of the application and marking the pausing, in the writeback cache. The method includes resuming the I/O operations of the application, after the marking and dumping data, according to the marking, from the writeback cache to a data node, as a snapshot.

20 Claims, 5 Drawing Sheets

(51) Int. Cl.
  *G06F 13/40*    (2006.01)
  *G06F 9/455*    (2018.01)
  *G06F 3/06*    (2006.01)
  *G06F 12/0804*    (2016.01)
  *G06F 12/0815*    (2016.01)

(52) U.S. Cl.
  CPC .......... *G06F 3/0619* (2013.01); *G06F 3/0631* (2013.01); *G06F 3/0659* (2013.01); *G06F 9/45558* (2013.01); *G06F 11/1451* (2013.01); *G06F 12/0804* (2013.01); *G06F 12/0815* (2013.01); *G06F 2009/45579* (2013.01); *G06F 2201/84* (2013.01); *G06F 2212/1032* (2013.01); *G06F 2212/152* (2013.01); *G06F 2212/281* (2013.01)

(58) Field of Classification Search
  CPC ....... G06F 2009/45579; G06F 2201/84; G06F 2212/1032; G06F 2212/152; G06F 2212/281; G06F 3/0613; G06F 3/0619; G06F 3/0631; G06F 3/0659
  See application file for complete search history.

SYSTEM AND METHOD FOR CREATING SNAPSHOTS IN OPENFLAME ENVIRONMENT

BACKGROUND

Computing systems with direct attached storage (DAS) generally require involvement of the processor in order to perform snapshots and data backups, since it is only through the processor that the direct attached storage is accessed. Snapshots and data backups thus disrupt execution of applications and may require application downtime or scheduling. Snapshots occupy storage space on a primary compute node where applications are running, resulting in extra space requirements on the compute node. Restoring data to direct attached storage in such a computing system also disrupts execution of applications, and may be impossible when an application or processor has crashed. Also, in systems with direct attached storage, backups, antivirus scans, and extraction transformation and loading (ETL) processing require use of resources on a primary compute node, which may slow execution of applications. Therefore, there is a need in the art for a solution which overcomes the drawbacks described above.

SUMMARY

In some embodiments, a method for creating snapshots and backups in a virtual computing environment is provided. The method includes writing application output of an application spanning one or more virtual machines as an application consistency group to a writeback cache, wherein the one or more virtual machines are implemented using one or more compute nodes and wherein the writeback cache is implemented in direct attached storage in the one or more compute nodes. The method includes pausing I/O (input/output) operations of the application and marking the pausing, in the writeback cache. The method includes resuming the I/O operations of the application, after the marking and dumping data, according to the marking, from the writeback cache to a data node, as a snapshot.

In some embodiments a tangible, non-transitory, computer-readable media having instructions thereupon which, when executed by a processor, cause the processor to perform a method. The method includes executing an application spanning an application consistency group of one or more virtual machines, with I/O operations to direct attached storage via a writeback cache and pausing the I/O operations of the application consistency group. The method includes writing an epoch marker to the writeback cache, to mark the pausing, resuming the I/O operations, and dumping data of the writeback cache, in accordance with the epoch marker, to a data node as a snapshot.

In some embodiments, a virtual environment computing system is provided. The system includes a plurality of compute nodes coupled as a compute plane and configured to host a plurality of virtual machines executing a plurality of applications. The plurality of compute nodes include direct attached storage (DAS). The system includes a plurality of data nodes coupled as a data plane and configured as virtual storage and a controller coupled to the compute plane and the data plane, the controller configured to perform actions. The actions include coordinating the plurality of virtual machines to pause I/O (input/output) operations involving the direct attached storage. The actions include directing one or more snapshots from the direct attached storage to specified ones of the plurality of data nodes with the pause of the I/O operations marked in the direct attached storage and coordinating the plurality of virtual machines to resume I/O operations upon completion of marking the pause of the I/O operations.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A virtual computing environment, with virtualized storage, and ability to make snapshots and backups is herein described. A system and related method for creating snapshots, and backups, in a virtual computing environment are disclosed. Various embodiments of the computing and storage system provide a storage cluster with a compute plane, a data management plane and a control plane, supporting virtual machines in a distributed manner. Data nodes can be added, compute nodes can be added, applications can be added and managed, data can be migrated in and out, virtual machines can be migrated in and out, and the system is scalable.

Networked compute nodes, with direct attached storage (DAS), implement the virtual machines. Networked data nodes, with data node storage, cooperate with a storage virtualizer that has a writeback cache, to form virtualized storage. An application, which can span one or more virtual machines as an application consistency group, uses the writeback cache for application I/O (input/output). In order to make a snapshot, the storage virtualizer quiets the application I/O, inserts an epoch marker into the writeback cache, then resumes the application I/O. Data is dumped from the writeback cache to a data node, for the snapshot. Backups are performed by writing data from the data node to backup storage, with the application I/O enabled. Snapshots and backups can be performed to granularity of the application consistency group, granularity of the virtual machine, or granularity of the virtual disk. To restore from a snapshot, a snapshot object on a compute node is linked to snapshot image data on the data node. To restore from a backup, backup data is written from a backup image in backup storage to a snapshot image on the data node, and the restoring proceeds as if restoring from a snapshot. The system minimizes application disruption or downtime, and minimizes burden on the compute resources that are servicing the application. Various embodiments have ability to create snapshots without impacting primary application performance, ability to create application consistent snapshots of multiple virtual machines running across compute nodes, and ability to retrieve snapshots spanning across multiple data planes.

Figure 1:
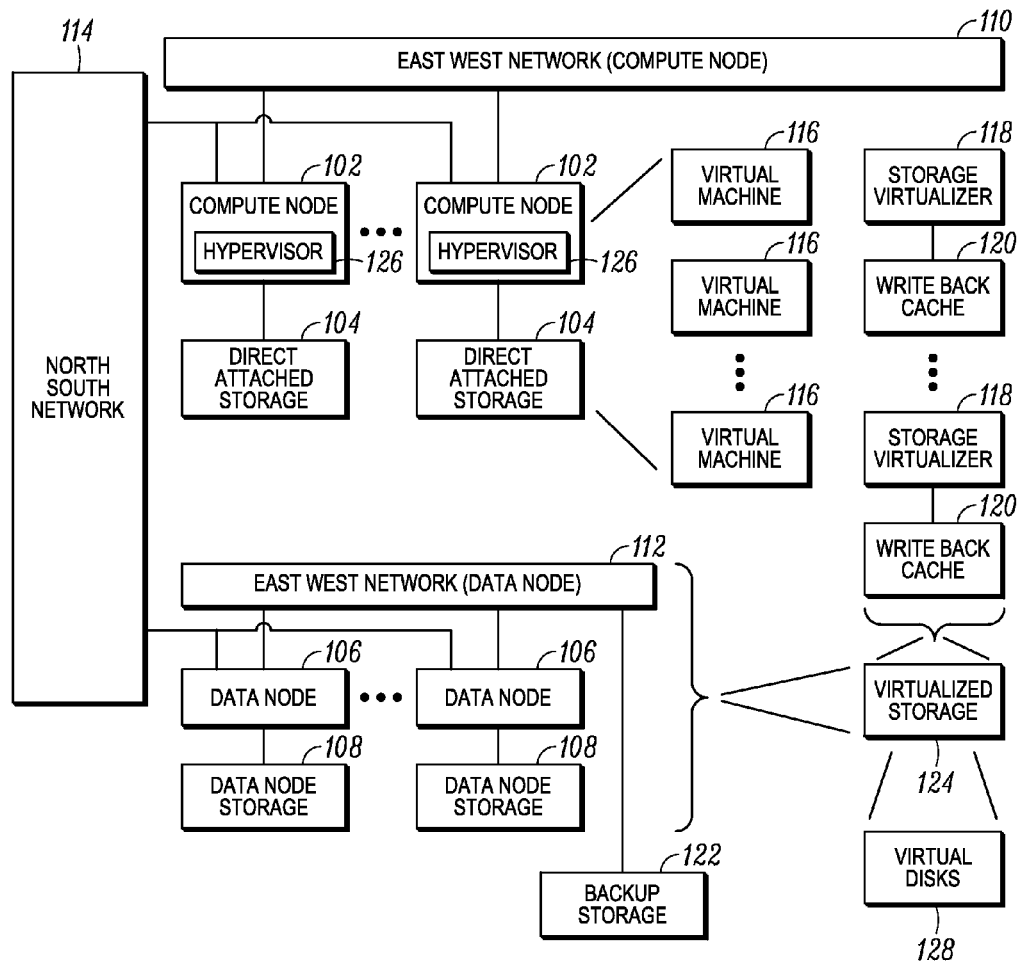
FIG. 1 is a block diagram of a computing and storage system that hosts virtual machines and one or more storage virtualizers, and performs snapshots and backups in accordance with an embodiment of the present disclosure.
Figure 2:
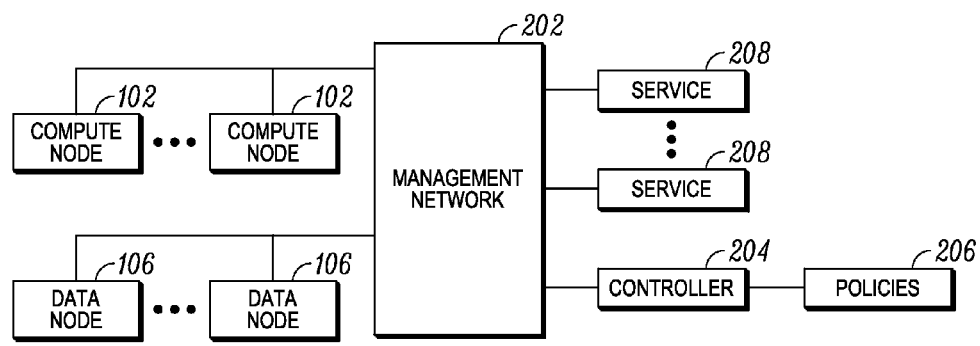
FIG. 2 is a block diagram showing a management network coupled to compute nodes and data nodes of the computing and storage system of FIG. 1, and a controller in or coupled to the management network, which implements policies relating to snapshots and backups.

FIG. 1 is a block diagram of a computing and storage system that hosts virtual machines 116 and one or more storage virtualizers 118, and performs snapshots and backups in accordance with an embodiment of the present disclosure. Compute nodes 102, with direct attached storage 104, are coupled together by a network 110, in this example called the East-West network 110 for compute nodes. These interconnected compute nodes 102 are called a compute plane, or compute planes (depending upon how the virtual machines 116 are organized). The direct attached storage 104 of each compute node 102 is coupled to physical computing resources of that compute node (e.g., one or more processors), but is not coupled to other direct attached storages 104 of other compute nodes 102, or to other compute nodes 102 or resources outside of the compute nodes 102 except via the computing resources of the compute node 102 to which the direct attached storage 104 belongs. Data nodes 106, with data node storage 108, are coupled together by a network 112, in this example called the East-West network 112 for data nodes. These interconnected data nodes 106 are called a data plane or data planes (depending upon how virtual storage is organized). The compute nodes 102 are coupled to the data nodes 106 by a network 114, in this example called the north-south network 114. Further coupling is shown in FIG. 2.

Continuing with FIG. 1, the compute nodes 102, with direct attached storage 104, implement virtual machines 116. For example, hypervisors 126 in compute nodes 102 could assign physical computing resources, including processing resources and local memory, to virtual machines 116. One or more applications can execute on the virtual machines 116, as will be discussed with reference to FIG. 3. For example, one virtual machine 116 could be serving a web application, other virtual machines 116 could be serving database applications, one or more virtual machines 116 could be running a business application, etc.

One of the virtual machines 116 is a special type called a storage virtualizer 118. The storage virtualizer 118 has a writeback cache 120, which is implemented in the direct attached storage 104. There can be multiple storage virtualizers 118. In some embodiments, each compute node 102 implements a storage virtualizer 118 and a portion of a virtual machine 116, or one or more virtual machines 116, executing one or more applications. The storage virtualizer(s) 118, with writeback cache(s) 120, and the networked data nodes 106, with data node storage 108, implement virtualized storage 124, e.g., in the form of virtual disks 128, for the virtual machines 116.

As will be further described with reference to FIG. 3, the virtual machines 116 write application data through the storage virtualizer 118 to the writeback cache 120. The storage virtualizer 118 manages the writeback cache 120, and transfers incremental updates of the application data to the data nodes 106 as snapshots. Backups are performed by writing from the data nodes 106 to a backup storage 122, which is coupled to the data nodes 106 by the network 112. Restores, from snapshots or backups, proceed from these resources back to the direct attached storage 104 of the compute nodes 102. Further details of the computing and storage system of FIG. 1 may be found in U.S. application Ser. No. 14/284,070, entitled DATA MANAGEMENT TIER COUPLING PRIMARY STORAGE AND SECONDARY STORAGE, filed May 21, 2014, which is incorporated herein by reference for all purposes.

FIG. 2 is a block diagram showing a management network 202 coupled to compute nodes 102 and data nodes 106 of the computing and storage system of FIG. 1, and a controller 204 in or coupled to the management network 202, which implements policies 206 relating to snapshots and backups. The management network 202 spans the compute and data planes, and defines a management or control plane. One or more services 208 are coupled to the management network 202. In various embodiments, these services 208 may coordinate the entire cluster, and may be open stack permitted. One or more services 208 could manage the hypervisors 126, manage storage and latencies, or direct where data should be dumped, e.g., direct compute nodes 102 to data nodes 106. Although the north-south network 114 couples the compute nodes 102 and the data nodes 106 for purposes of data transfer, the management network 202 couples the compute nodes 102 and the data nodes 106 for purposes of managing these. Particularly, the controller 204 communicates with the storage virtualizer(s) 118, which are implemented in the compute nodes 102, and communicates with the data nodes 106 for specific tasks relating to the policies 206. For example, a policy 206 could specify aspects of snapshots, backups and restore operations, which the controller 204 directs via the management network 202.

Figure 3:
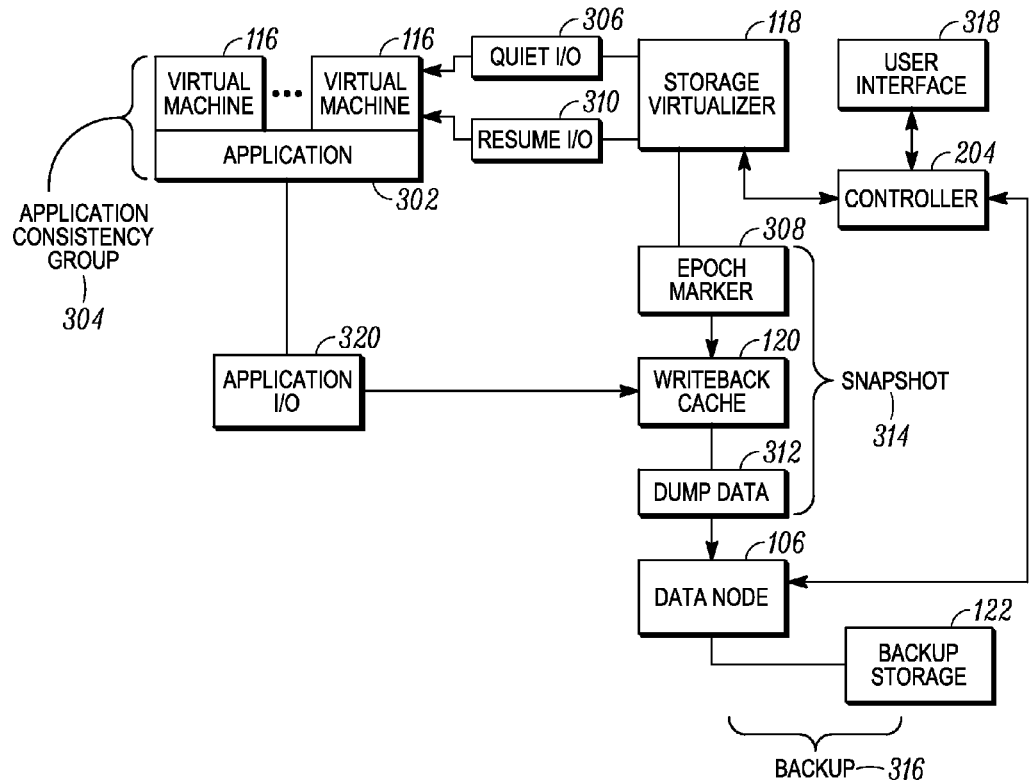
FIG. 3 is a system action diagram depicting a snapshot and a backup, as performed on the computing and storage system of FIGS. 1 and 2.

FIG. 3 is a system action diagram depicting a snapshot 314 and a backup 316, as performed on the computing and storage system of FIGS. 1 and 2. Snapshots 314 and backups 316 differ in where the data is located. A snapshot 314 can be quickly restored from a data node 106, while a backup image is typically on the backup side in backup storage 122. Restoring from backup storage 122 takes more time, but backup storage 122 is generally less expensive.

Although a single application 302 is depicted in FIG. 3 for purposes of illustrating a snapshot 314 and a backup 316, it should be appreciated that multiple applications 302 can be executing in one or more virtual machines 116 in the system at any given moment. In this example, the application 302 spans across multiple virtual machines 116, and may span across multiple compute nodes 102 and/or across multiple hypervisors 126. These virtual machines 116, executing this application 302, are called an application consistency group 304. In other words, these specific virtual machines 116 form a group across which the application 302 executes. In further examples, an application 302 could be running on one virtual machine 116, a virtual machine 116 could be executing multiple applications 302, and various further possibilities are readily devised. Differing applications 302 could span differing application consistency groups 304, with or without overlap of virtual machine 116 membership.

The application 302 performs application I/O 320 via a writeback cache 120. In some embodiments, writes and overwrites (e.g., part of the application I/O 320) are written in the form of a log, for example a virtual disk-specific, shared storage device (SSD) log area implemented as or in the writeback cache 120. In some embodiments, the writeback cache 120 writes data to the data node 106 at regular or irregular intervals, on an incremental change basis. In some embodiments, the writeback cache 120 writes data to the data node 106 only for snapshots 314. Below is a description of how a snapshot 314 works.

The controller 204 initiates a snapshot 314, for example in accordance with a policy 206, at a user-configured interval, e.g. an episodic data sink (EDS) every 10 minutes or other interval, or as directed via the user interface 318. The controller 204 directs the storage virtualizer 118 to coordinate the virtual machines 116. The storage virtualizer 118 directs quiet I/O 306 to the virtual machines 116 in an application consistency group 304. For example, the storage virtualizer 118 could send a message to the virtual machines 116 instructing them to pause their application I/O 320. When the virtual machines 116 in the application consistency group 304 have paused (i.e., stopped) their application I/O 320 (i.e., quiet I/O 306 is performed or implemented by the virtual machines 116 in a manner appropriate for the application 302), the storage virtualizer 118 inserts (e.g., writes) an epoch marker 308 into the writeback cache 120, e.g., by writing the epoch marker 308 into the virtual disk-specific SSD log area. After inserting the epoch marker 308 to the virtual machines in the application consistency group 304, the storage virtualizer 118 directs resume I/O 310 to the virtual machines 116. That is, the storage virtualizer 118 communicates to the virtual machines 116 that they can resume or continue their application I/O 320 to the writeback cache 120, i.e., "unquiet" the application I/O 320.

The controller 204, which is monitoring the data nodes 106, identifies a particular data node 106 or data nodes 106 as suitable for receiving a data dump, i.e., the snapshot 314. For example, the selection of data node(s) 106 could depend on how much data is being dumped, and whether this is an episodic or incremental data dump, or a data dump for a full or complete snapshot 314. In some embodiments, the controller 204 identifies the data node 106 with an IP (Internet Protocol) address of the data node 106. With the application I/O 320 resumed, the controller 204 directs the storage virtualizer 118 to perform a dump data 312 operation from the writeback cache 120 to the data node 106, as the snapshot 314. The dump data 312 can be implemented as a download from the writeback cache 120 the identified data node 106, via the north-south network 114. Often, and in some embodiments always, the dump data 312 is an incremental or differential data update since the last or previous data dump, and is performed with the application 302 executing and minimal disruption to the virtual machines 116 in the application consistency group 304. For example, each new version could be assigned a logical version as a logical entity, with a unique identifier, and could be in a differential format. In some embodiments, the storage virtualizer 118 declares that the snapshot 314 is in a "creating" state while the dump data 312 is in progress, and is in a "created" state when the dump data 312 is complete, e.g., when notified by the data node 106. The dump data 312 could be performed immediately, or scheduled if the data node 106 is busy at the time. If busy, the data node could later respond that it is now ready, and the dump data 312 could be performed.

To perform a backup 316, the controller 204 initiates a backup operation, for example in accordance with a policy 206, or as directed via the user interface 318. Data from a snapshot 314 is copied from the data node 106 to a backup storage 122. This can occur while the application 302 is executing on the virtual machines 116, and does not have application I/O 320 paused. In one scenario, a backup system, e.g., with a backup server that manages the backup storage 122, calls "create_backup" for a specified virtual machine object, and the present system responds with a list of web URLs (universal resource locators) that show where to read the metadata and data for a virtual machine 116. The backup system then reads from the data nodes 106, e.g., via the East-West network 112 for data nodes, using the appropriate web URLs, and writes to the backup storage 122. In some embodiments, if a recent snapshot 314 is not available, the system makes a snapshot 314 and then makes a backup 316.

To backup a virtual machine 116, in some embodiments the system backs up the intent, e.g., metadata of a virtual machine 116, which includes configuration parameters for the virtual machine such as quality of service (QoS), service level agreements (SLA), EDS interval, and other parameters. These may be obtained on the management or control plane, in some embodiments. In some embodiments, the system backs up the list of changed blocks, which is a list of blocks which are modified since the previous backup. In some embodiments, the system backs up the actual data which are the actual data blocks of the virtual disk. This is so that during restore, the system will be able to re-create the application virtual machine exactly as it was backed up from the perspective of data, the computer execution environment, and the service level agreements. When a backup application requests backing up a specified virtual machine 116, the intent (e.g., metadata) is obtained from the control plane. For backing up the list of changed blocks and actual data, the backup application is pointed to the corresponding data node 106. This ensures that data flows directly from the data node 106 to the backup application (and the backup storage 122) without impacting the running application 302.

As directed by policies 206 and/or user input via the user interface 318, the snapshots 314 and backups 316 can be performed by the system to the granularity of an application consistency group 304, granularity of a virtual machine 116, or granularity of one or more virtual disks 128 as implemented in the virtualized storage 124. That is, a snapshot 314 or a backup 316 can be initiated and performed to capture a snapshot 314 or a backup 316 of a specific virtual machine 116, application consistency group 304 for a specific application or applications 302, or a specific virtual disk 128 or group of virtual disks 128. The system supports all of these granularities, in some embodiments, and at least one of these granularities, in various embodiments. A backup 316 can be taken from the data plane while the application 302 continues to run on the compute plane. An applications scan, or an antivirus scan, can be run on data in the data nodes 106 or data in the backup storage 122, without using compute resources from the compute nodes 102.

Figure 4:
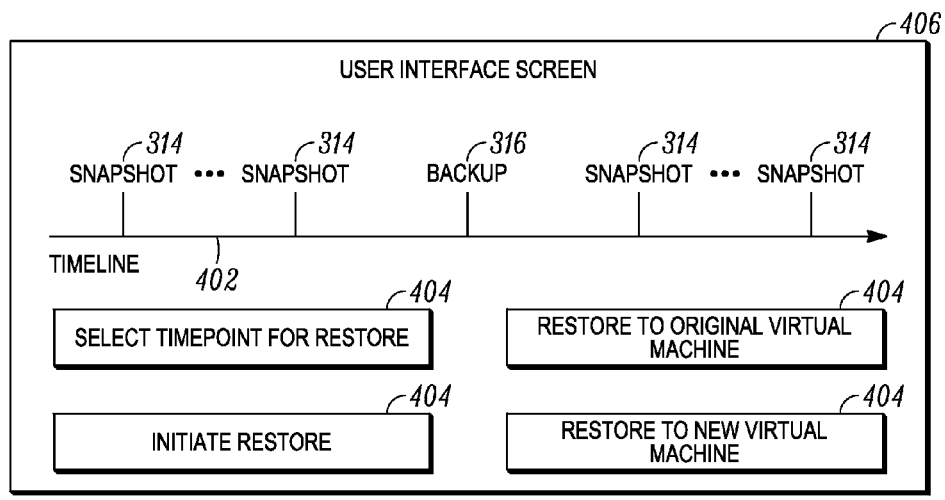
FIG. 4 is an example user interface screen showing a timeline with snapshots and a backup, with various options for restoring.

FIG. 4 is an example user interface screen 406 showing a timeline 402 with snapshots 314 and a backup 316, with various options for restoring. Restoring occurs from the data plane to the compute plane. Some embodiments of the user screen 406 show virtual disks 128, and allow selection of a virtual disk 128, virtual machines 116 with selection of a virtual machine 116, or application consistency group 304, with selection of an application consistency group 304. Snapshots 314 and backups 316 are displayed accordingly. The options are shown as soft buttons 404, but could also be implemented as drop-down menus, icons or in other formats as readily devised. One soft button 404 allows the user to "select time point for restore", inviting the user to select one of the snapshots 314 or backups 316 shown on the timeline 402. Two more soft buttons 404 allow the user to "restore to original virtual machine" or "restore to new virtual machine". Pressing either of these soft buttons 404 could bring up lists or diagrams or other representations of existing or new virtual machines 116. After selecting a snapshot 314 or a backup 316, and selecting whether to restore to an original virtual machine or a new virtual machine, the user could click on the "initiate restore" soft button 404. In some embodiments the snapshots 314 and backups 316 are represented on the user interface screen 406 in undifferentiated form, so that it is transparent to the user whether a time point is associated with a snapshot 314 or a backup 316. Further embodiments of the user interface screen 406 are readily devised in accordance with the teachings herein.

With reference back to FIGS. 1-3, if a snapshot 314 is selected for restore, the restore proceeds as follows. A snapshot is restored from the data node 106 itself, and thus is rapid. The controller 204 directs the storage virtualizer 118 to create a complete or full snapshot in the data node 106, from the incremental or differential snapshot data. The storage virtualizer 118 starts reading from the most recent snapshot 314 data in the data node 106, and continues reading to a previous version in an iterative manner until the storage virtualizer 118 finds the data of interest. Once the complete snapshot is built in the data node 106, the storage virtualizer 118, or the controller 204, creates a snapshot object on the compute node 102 of interest. This could be the compute node 102 hosting the original virtual machine 116, or a compute node 102 that will be assigned to a newly created virtual machine 116, as appropriate to direction by the policies 206 or the user interface 318. The snapshot object on the compute node 102 is then linked to the complete snapshot on the data node 106, as restored from incremental dump data 312 on the data node 106. The completed snapshot is attached to the original virtual machine 116 or the new virtual machine 116 as appropriate. This completes the restore from a snapshot 314.

In the case of an application 302 spanning multiple virtual machines 116 and multiple data nodes 106, the snapshot 314 spans this. In a recovery, data can be recovered from multiple data nodes 106, all from a single snapshot 314. Data can be restored to one specific data node 106, e.g., if that data node 106 had failed.

With continued reference back to FIGS. 1-3, if a backup 316 is selected for restore, the restore proceeds as follows. The selected backup image is copied from backup storage 122 to the data node 106, via the East-West network 112 for data nodes. A snapshot object is created on the compute node 102. The snapshot object is linked to the restored data on the data node 106. The new snapshot can be attached to the original virtual machine 116, or a new virtual machine 116 can be spawned from that snapshot. This process is similar to restoring from a snapshot, as described above, except that the snapshot is first created from the backup 316. Alternatively, in some embodiments, if a snapshot 314 corresponding to the backup 316 is still available on a data node 106, that snapshot 314 could be used.

Figure 5A:
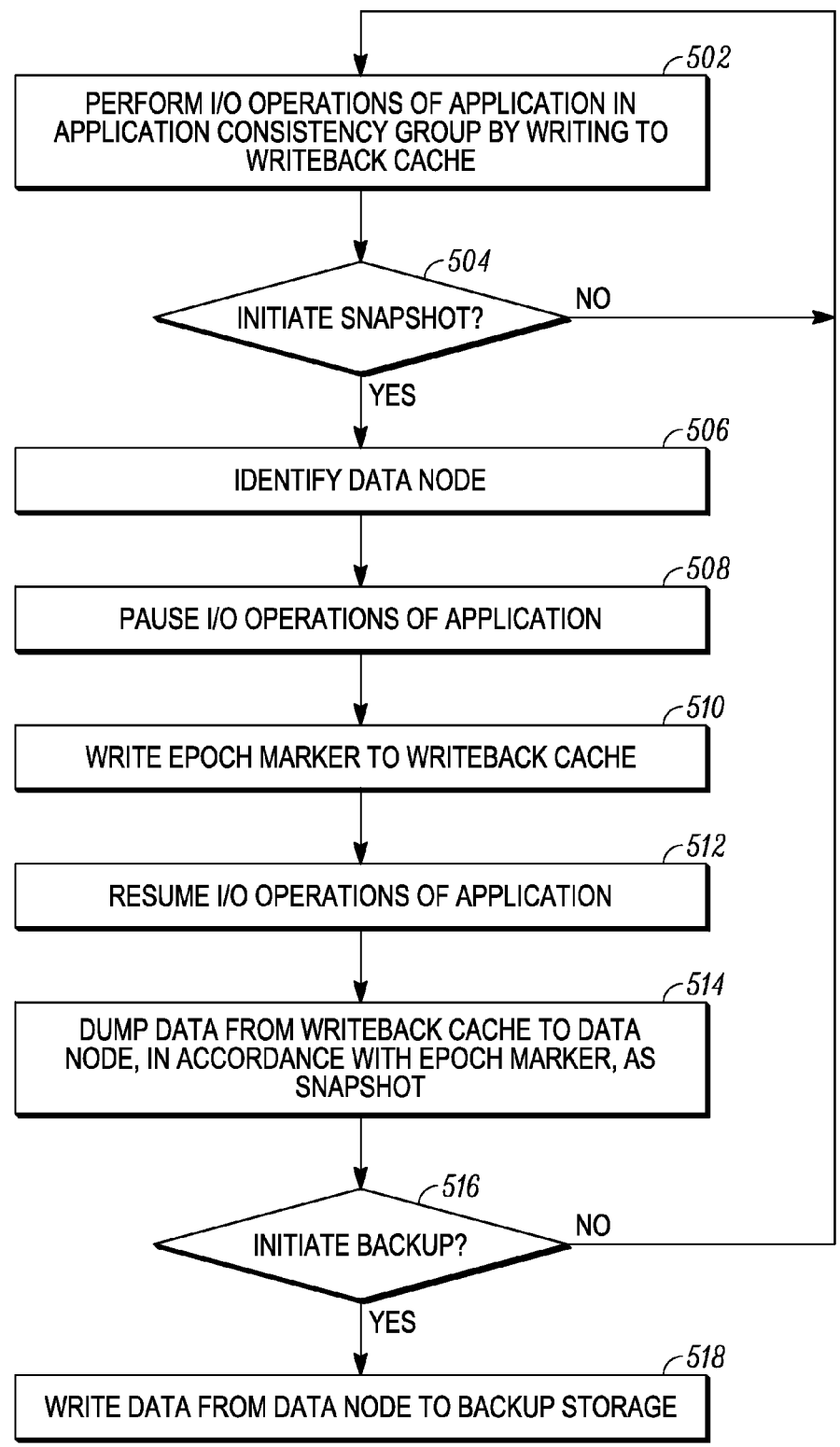
FIG. 5A is a flow diagram of a method for creating snapshots and backups in a virtual computing environment, which can be practiced on the system of FIGS. 1-4 and variations thereof.

FIG. 5A is a flow diagram of a method for creating snapshots and backups in a virtual computing environment, which can be practiced on the system of FIGS. 1-4 and variations thereof. The method can be practiced by various processors, such as processors in compute nodes, in data nodes, and in a controller coupled to the compute nodes and the data nodes.

In an action 502, I/O operations of an application in an application consistency group of virtual machines are performed by writing to a writeback cache. The writeback cache can be implemented in direct attached storage of compute nodes implementing the virtual machines. The writeback cache can be managed by a storage virtualizer implemented in the compute nodes as a virtual machine.

In a decision action 504, it is determined whether to initiate a snapshot. The snapshot could be initiated by a controller in adherence to a policy, or by a user via a user interface administered by the controller. If no snapshot is initiated, flow branches back to the action 502, in order to continue performing I/O operations of the application. If a snapshot is initiated, flow proceeds to the action 506, in which a data node is identified. The data node could be identified by the storage virtualizer.

I/O operations of the application are paused, in an action 508. This could be across the virtual machines of the application consistency group, as directed by the storage virtualizer, in response to the snapshot being initiated by the controller.

An epoch marker is written to the writeback cache, in an action 510. This marks the application data up to the moment at which the I/O operations of the application were paused. The storage virtualizer writes the epoch marker to the writeback cache, as described above with reference to FIG. 3. After the epoch marker is written to the writeback cache, I/O operations of the application are resumed, in an action 512. Data is dumped from the writeback cache to the data node, in accordance with the epoch marker, as a snapshot, in an action 514. This data dump is managed by the storage virtualizer. In some embodiments, the data dump is incremental or differential over a previous snapshot, e.g., the immediately preceding snapshot.

In a decision action 516, it is determined whether to initiate a backup. In further embodiments of the method, this decision action 516 could take place at other times during the operations. If there is no initiation of a backup, flow branches back to the action 502, to continue the I/O operations of the application. If there is initiation of a backup, flow proceeds to the action 518, in which data is written from the data node to the backup storage. The data is written in accordance with an epoch marker, so that the backup data records a full snapshot as a full backup, or records an incremental backup, in various embodiments. The backup can be performed while the I/O operations of the application are enabled, since the backup operation does not use resources of the compute node or the direct attached storage of the compute node.

Figure 5B:
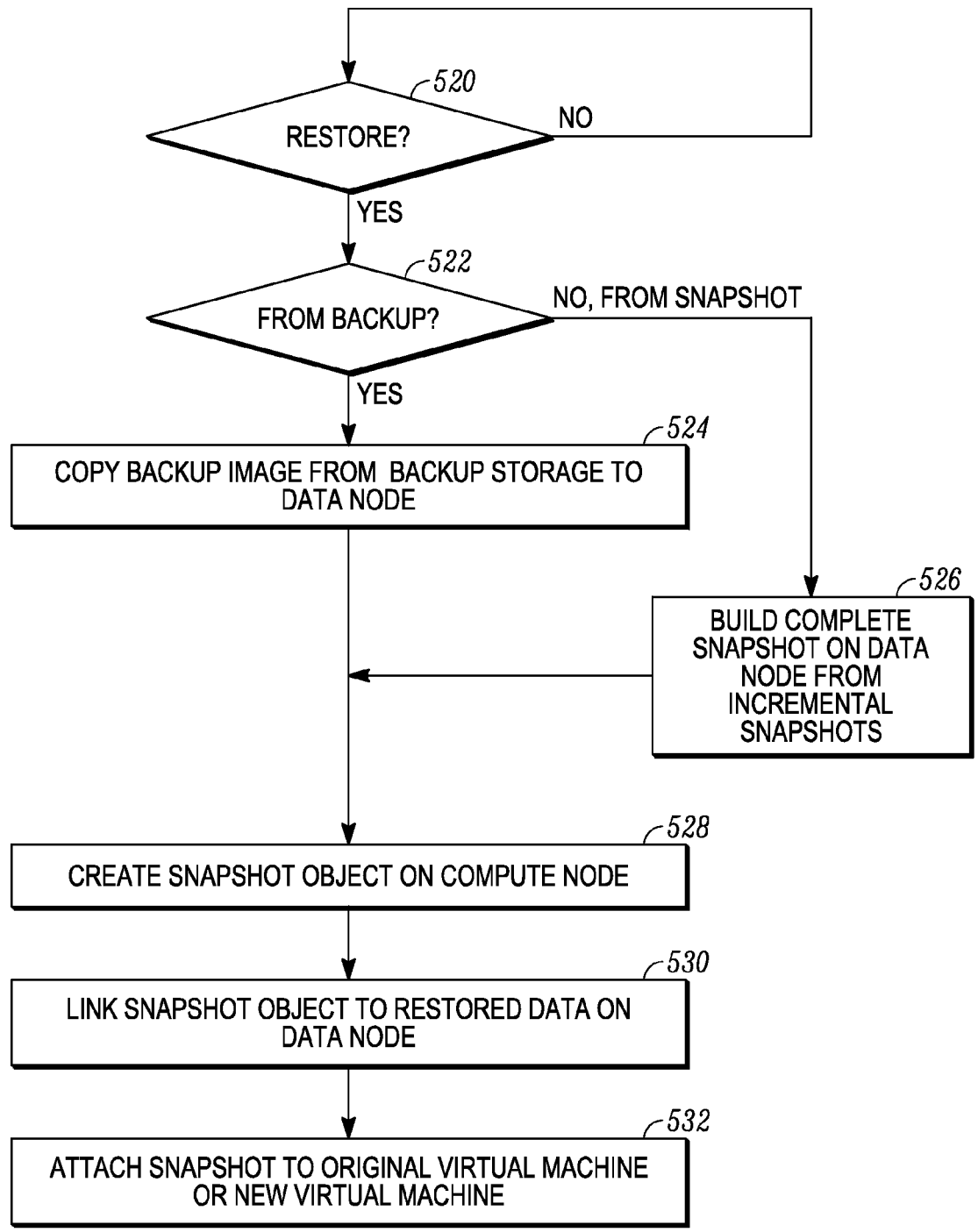
FIG. 5B is a flow diagram of a method for restoring from snapshots and backups in a virtual computing environment, which can be practiced on the system of FIGS. 1-4 and variations thereof.

FIG. 5B is a flow diagram of a method for restoring from snapshots and backups in a virtual computing environment, which can be practiced on the system of FIGS. 1-4 and variations thereof. The method can be practiced by various processors, such as processors in compute nodes, in data nodes, and in a controller coupled to the compute nodes and the data nodes.

In a decision action 520, it is determined whether there should be a restore. If the answer is no, the flow loops at the decision action 520, or proceeds elsewhere in variations. If the answer is yes, there should be a restore, flow proceeds to the decision action 522.

In the decision action 522, it is determined whether the restore is from a backup. If the answer is no, the restore is not from a backup, then the restore is from a snapshot, and flow proceeds to the action 526. In the action 526, a complete snapshot is built on a data node, from incremental snapshots. In a variation, if a complete snapshot is available on the data node, the complete snapshot is used in the later action 530. Flow proceeds from the action 526 to the action 528.

If the answer in the decision action 522 is yes, the restore is from a backup, flow proceeds to the action 524. In the action 524, a backup image is copied from the backup storage to the data node. In a variation, if the backup data is incremental backups, a complete backup image is built from the incremental backups, and written to the data node. Flow then proceeds to the action 528.

In the action 528, a snapshot object is created on a compute node. In an action 530, the snapshot object is linked to the restored data on the data node. Regardless of whether the restored data on the data node was created from a backup image or from incremental snapshots, or exists as a complete snapshot, the linking of the snapshot object on the compute node to the now available complete snapshot on the data node sets up the system for the action 532.

In the action 532, the snapshot is attached to the original virtual machine or a new virtual machine. The decision of whether to attach to the original virtual machine or a new virtual machine could be based on a policy, user selection via a user interface, or a determination of whether the original virtual machine and underlying compute node resources are available or damaged, etc. By attaching the snapshot to a virtual machine, the system restores to the state represented in the snapshot.

Figure 6:
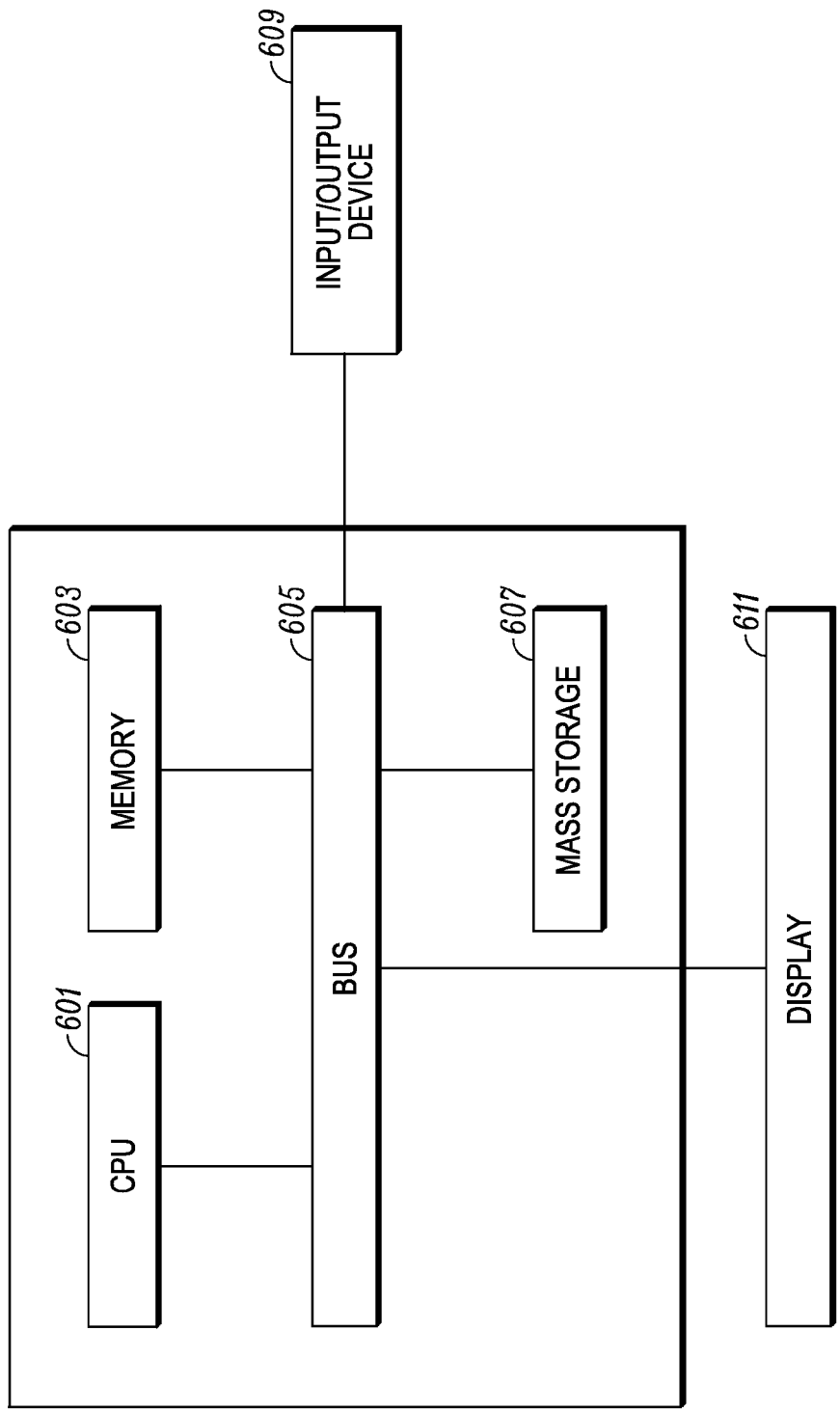
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for creating snapshots and backups, and restoring, in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for creating snapshots and backups in a virtual computing environment, comprising:
   writing application output of an application spanning one or more virtual machines as an application consistency group to a writeback cache, wherein the one or more virtual machines are implemented using one or more compute nodes and wherein the writeback cache is implemented in direct attached storage in the one or more compute nodes;
   pausing I/O (input/output) operations of the application;
   marking the pausing, in the writeback cache;
   resuming the I/O operations of the application, after the marking; and
   dumping data, according to the marking, from the writeback cache to a data node, as a snapshot.

2. The method of claim 1, wherein the marking the pausing includes writing an epoch marker into the writeback cache.

3. The method of claim 1, wherein the snapshot is one of a plurality of snapshots, each having a unique snapshot identifier and each being incremental to a previous snapshot.

4. The method of claim 1, further comprising:
   writing a backup from the data node to a backup storage, while the I/O operations of the application are enabled.

5. The method of claim 1, further comprising:
   representing at least one snapshot image and at least one backup image in a user interface;
   receiving a user selection of a snapshot image or a backup image; and
   restoring a virtual machine in accordance with the user selection.

6. The method of claim 1, further comprising:
   restoring data from a backup image in a backup storage onto the data node, responsive to a restore operation;
   creating a snapshot object on a compute node;
   linking the snapshot object to the restored data on the data node; and attaching the snapshot object to one of: an original virtual machine or a new virtual machine.

7. The method of claim 1, further comprising:
determining to which granularity of a plurality of supported granularities to perform a backup, wherein the plurality of supported granularities includes a granularity of a virtual machine, a granularity of an application consistency group, and a granularity of a virtual disk; and
writing a backup from the data node to a backup storage, at the determined granularity.

8. A tangible, non-transitory, computer-readable media having instructions thereupon which, when executed by a processor, cause the processor to perform a method comprising:
executing an application spanning an application consistency group of one or more virtual machines, with I/O (input/output) operations to direct attached storage via a writeback cache;
pausing the I/O operations of the application consistency group;
writing an epoch marker to the writeback cache, to mark the pausing;
resuming the I/O operations; and
dumping data of the writeback cache, in accordance with the epoch marker, to a data node as a snapshot.

9. The computer-readable media of claim 8, wherein the data of the writeback cache is dumped to the data node as an incremental version since a previous snapshot.

10. The computer-readable media of claim 8, wherein the method further comprises:
writing data from the data node to a backup storage, to a granularity of one of: a virtual machine, a virtual disk, or the application consistency group.

11. The computer-readable media of claim 8, wherein the method further comprises:
displaying, via a user interface, a plurality of snapshots and one or more backups in a timeline, for user selection to restore to a virtual machine.

12. The computer-readable media of claim 8, wherein the method further comprises:
restoring data from a backup image on backup storage to the data node;
linking a snapshot object on a compute node to the restored data on the data node; and
attaching the snapshot object to a virtual machine.

13. The computer-readable media of claim 8, wherein:
dumping the data of the writeback cache to the data node, as the snapshot, occurs with the I/O operations resumed; and
the snapshot is performed to a granularity of the application consistency group.

14. A virtual environment computing system, comprising:
a plurality of compute nodes coupled as a compute plane and configured to host a plurality of virtual machines executing a plurality of applications;
the plurality of compute nodes having direct attached storage (DAS);
a plurality of data nodes coupled as a data plane and configured as virtual storage; and
a controller coupled to the compute plane and the data plane, configured to perform actions comprising:
coordinating the plurality of virtual machines to pause I/O (input/output) operations involving the direct attached storage;
directing one or more snapshots from the direct attached storage to specified ones of the plurality of data nodes with the pause of the I/O operations marked in the direct attached storage; and
coordinating the plurality of virtual machines to resume I/O operations upon completion of marking the pause of the I/O operations.

15. The virtual environment computing system of claim 14, further comprising:
a storage virtualizer, implemented as a virtual machine in the compute plane; and
a writeback cache, coupled to the storage virtualizer, wherein the I/O operations involving the direct attached storage include writes to the writeback cache.

16. The virtual environment computing system of claim 14, further comprising:
a storage virtualizer having a writeback cache implemented in the direct attached storage, the storage virtualizer configured to write an epoch marker to the writeback cache to mark the pause of the I/O operations, responsive to the controller initiating a snapshot.

17. The virtual environment computing system of claim 14, further comprising:
a writeback cache, configured to receive data from the I/O operations involving the direct attached storage and configured to receive an epoch marker to mark the pause of the I/O operations, wherein the one or more snapshots from the direct attached storage to the specified ones of the plurality of data nodes includes the data from the I/O operations as written from the writeback cache to the specified ones of the plurality of data nodes in accordance with the epoch marker.

18. The virtual environment computing system of claim 14, further comprising:
the controller configured to direct a backup from the plurality of data nodes to backup storage to a granularity of one of: a virtual machine, an application consistency group, or a virtual disk.

19. The virtual environment computing system of claim 14, further comprising:
the controller configured to show a user interface with a plurality of snapshots and backups for user selection to restore to one or more of the plurality of virtual machines.

20. The virtual environment computing system of claim 14, further comprising:
the controller configured to direct a restore operation that includes restoring data from a backup image in backup storage to a data node, creation of a snapshot object on a compute node, linking the snapshot object to the restored data on the data node, and attaching the snapshot object to a virtual machine.

* * * * *